(12) United States Patent
Zheng et al.

(10) Patent No.: US 10,498,458 B2
(45) Date of Patent: Dec. 3, 2019

(54) OPTICAL N-LEVEL QUADRATURE AMPLITUDE MODULATION (NQAM) GENERATION BASED ON PHASE MODULATOR

(71) Applicant: Futurewei Technologies, Inc., Plano, TX (US)

(72) Inventors: Xueyan Zheng, Andover, MA (US); Yu Sheng Bai, Los Altos Hills, CA (US); Xiao Shen, San Bruno, CA (US); Yangjing Wen, Cupertino, CA (US)

(73) Assignee: Futurewei Technologies, Inc., Plano, TX (US)

( * ) Notice: Subject to any disclaimer, the term of this patent is extended or adjusted under 35 U.S.C. 154(b) by 304 days.

(21) Appl. No.: 15/342,975

(22) Filed: Nov. 3, 2016

(65) Prior Publication Data

US 2017/0134096 A1   May 11, 2017

Related U.S. Application Data

(60) Provisional application No. 62/250,171, filed on Nov. 3, 2015.

(51) Int. Cl.
| | | |
|---|---|---|
| *H04B 10/00* | (2013.01) | |
| *H04B 10/556* | (2013.01) | |
| *H04B 10/516* | (2013.01) | |
| *H04B 10/50* | (2013.01) | |
| *H04B 10/54* | (2013.01) | |
| *H04J 14/00* | (2006.01) | |

(52) U.S. Cl.
CPC ..... *H04B 10/5561* (2013.01); *H04B 10/5051* (2013.01); *H04B 10/5055* (2013.01); *H04B 10/50575* (2013.01); *H04B 10/5161* (2013.01); *H04B 10/541* (2013.01)

(58) Field of Classification Search
CPC .... H04B 10/80; H04B 10/801; H04B 10/802; H04B 10/505; H04B 10/5051; H04B 10/5055; H04B 10/548; H04B 10/556; H04B 10/50575; H04B 10/50595; H02P 13/00; H02P 13/06; H02P 13/08; H02P 13/10; H02P 13/12; H01F 38/16
See application file for complete search history.

(56) References Cited

U.S. PATENT DOCUMENTS

| | | | |
|---|---|---|---|
| 2007/0274731 A1 | 11/2007 | Boffi et al. | |
| 2009/0324253 A1* | 12/2009 | Winzer | H04B 10/505 398/185 |
| 2012/0155880 A1 | 6/2012 | Nishimoto et al. | |

(Continued)

OTHER PUBLICATIONS

Kiuchi, H., el al., "High Extinction Ratio Mach-Zehnder Modulator Applied to a Highly Stable Optical Signal Generator," IEEE Transactions on Microwave Theory and Techniques, vol. 55, No. 9, Sep. 2007, pp. 1694-1972.

(Continued)

*Primary Examiner* — Daniel G Dobson
(74) *Attorney, Agent, or Firm* — Conley Rose, P.C.

(57) ABSTRACT

An optical modulator for generating quadrature amplitude modulation (nQAM) and phase-shift keying (nPSK) signals with tunable modulation efficiency. The modulator includes a controlling circuit for adjusting the modulation efficiency or modulation depth of the modulator by controlling the direct current (DC) bias.

6 Claims, 9 Drawing Sheets

(56) References Cited

U.S. PATENT DOCUMENTS

2013/0155482 A1* 6/2013 Toya .................. G02F 1/01
359/279
2015/0132007 A1 5/2015 Zheng et al.
2015/0295650 A1* 10/2015 Lee .................. H04B 10/2575
398/115

OTHER PUBLICATIONS

T. Sakamoto, el al., "50-Gb/s 16 QAM by a Quad-Parallel Mach-Zehnder Modulator," Optical Communication—Post Deadline Papers, 33rd European Conference, 2007, 2 pages.
M. Serbay, et. al., "Implementation of Differential Precoder for High-Speed Optical DQPSK Transmission," Electronics Letters, vol. 40, Issue 20, Sep. 20, 2004, pp. 1288-1289.
Y. Ehrlichman, el al, "Improved Digital-to-Analog Conversion Using Multi-Electrode Mach-Zehnder Interferometer," Journal of Lightwave Technology, vol. 26, No. 21, Nov. 1, 2008, pp. 3567-3575.
Foreign Communication From a Counterpart Application, PCT Application No. PCT/CN2016/060381, English Translation of International Search Report dated Feb. 10, 2017, 6 pages.
Foreign Communication From a Counterpart Application, PCT Application No. PCT/CN2016/060381, English Translation of Written Opinion dated Feb. 10, 2017, 10 pages.
Ehrlichman, Y., et al., "A Method for Generating Arbitrary Optical Signal Constellations Using Direct Digital Drive" Journal of Lightwave Technology, vol. 29, No. 17, Sep. 1, 2011, pp. 2545-2551.

* cited by examiner

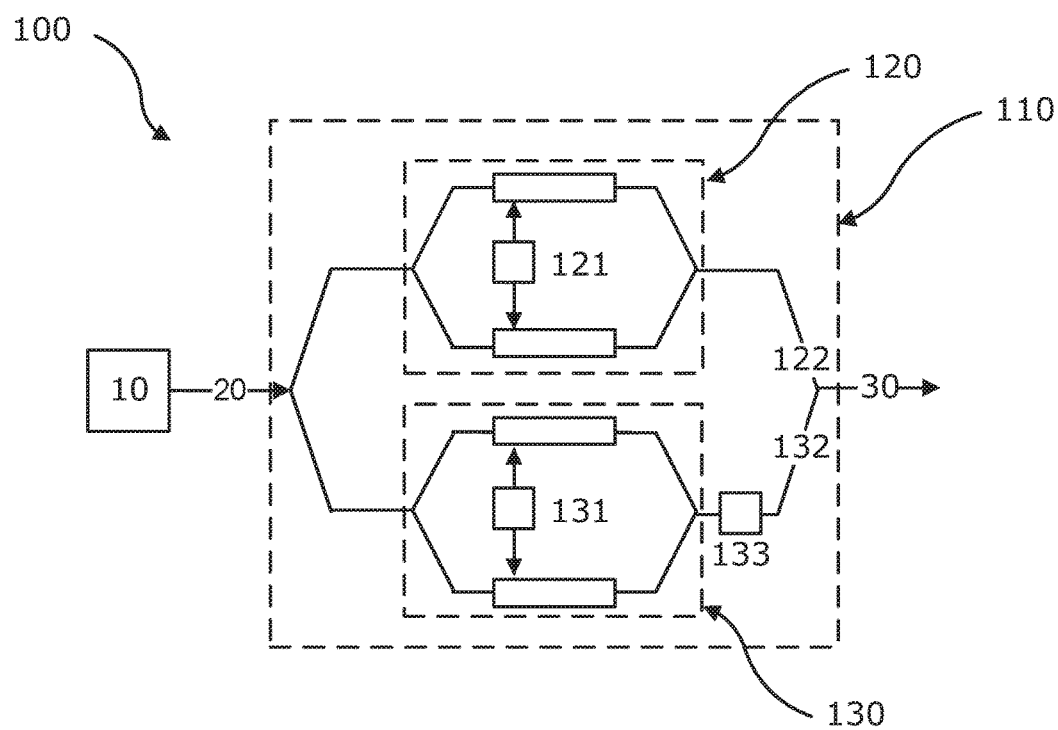
FIG. 1 (Prior Art)
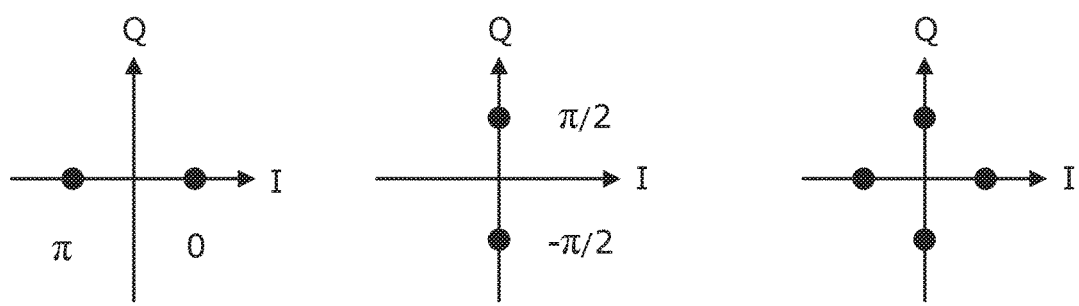
FIG. 2A
(Prior Art)
FIG. 2B
(Prior Art)
FIG. 2C
(Prior Art)

OPTICAL N-LEVEL QUADRATURE AMPLITUDE MODULATION (NQAM) GENERATION BASED ON PHASE MODULATOR

CROSS-REFERENCE TO RELATED APPLICATIONS

The present application claims priority to U.S. Provisional Patent Application Ser. No. 62/250,171, by Xueyan Zheng et al., filed Nov. 3, 2015, titled "Optical N-Level Quadrature Amplitude Modulation (nQAM) Generation Based on Phase Modulator," and incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In metro and short-reach optical networks, such as inter- and intra-data centers, low power consumption, low cost, and high density are three important factors for optoelectronics components. However, optical networks commonly employ a large number of optical transceivers, which are the most expensive components and consume the most power. Optical transceivers may include components, such as high-speed analog-to-digital converters (ADCs), high-speed digital-to-analog converters (DACs), optical modulators, and radio frequency (RF) drivers. In order to meet the higher and higher bandwidth requirements due to the exponential growth of Internet traffic, advanced modulation formats that are used in optical long haul transmission systems, such as direct detection-differential quadrature phase-shift keying (DD-DQPSK), dual-polarization quadrature phase-shift keying (DP-QPSK), and 16 quadrature amplitude modulation (16QAM), are also deployed in short-reach networks. However, most of the optical components used in long haul transmission systems may not satisfy the low power consumption, low cost, and high density requirements in short-reach and metro optical networks.

Most of the advanced modulation formats in commercial optical equipment are based on Mach-Zehnder modulators (MZMs). The working principle of MZMs is to modulate the optical phase difference between two waveguides, which then interfere constructively or destructively to achieve amplitude modulation and phase modulation on the output. For example, MZMs are employed to generate highly stable optical signals as described in H. Kiuchi, et. al., "High Extinction Ratio Mach-Zehnder Modulator Applied to a Highly Stable Optical Signal Generator," Institute of Electronics and Electrical Engineers (IEEE) Transactions of Microwave Theory and Techniques, Vol. 55, No. 9, September 2007, pp. 1694-1972, which is incorporated by reference. MZMs that are commonly employed in industry may include lithium nobiate ($LiNbO_3$)-based MZMs, indium phosphide (InP)-based MZMs, and silicon (Si)-based MZMs. Due to the high-density requirement in optical transmitters, $LiNbO_3$-based transmitters may not be suitable for short-reach applications. The highly integrated Si-based transmitters and InP-based transmitters are more suitable for short-reach applications.

FIG. 1 is a schematic diagram of a conventional optical in-phase quadrature-phase quadrature phase-shift keying (IQ QPSK) modulator 100 which modulates an input signal 20 emitted by laser diode (LD) 10 according to a digital signal to produce a modulated output signal 30. Modulator 100 comprises three MZMs 110, 120, and 130. MZMs 120 and 130 are referred to as child modulators and MZM 110 is referred to as a parent modulator. MZMs 120 and 130 are positioned in parallel with each other. MZM 120 is configured to generate in-phase (I) components according to RF driver 121. MZM 130 is configured to generate quadrature-phase (Q) components according to RF driver 131. The output of MZM 130 passes through phase shifter 133, and output signals 122 and 132 are combined, resulting in modulated output data signal 30. MZMs 120 and 130 operate at null points, which are transmission minimum points, and MZM 110 operates at a quadrature point, which is a 3 decibel (dB) loss point. FIGS. 2A-2C illustrate the output signals, in the form of constellation diagrams, as generated by the MZMs of IQ QPSK modulator 100. FIG. 2A illustrates a constellation diagram of output signal 122 of MZM 120. FIG. 2B illustrates a constellation diagram of output signal 132 of MZM 130. FIG. 2C illustrates a constellation diagram of an output signal 30 of modulator 100.

Modulator 100 may be employed to generate 16QAM and higher order modulation signals by configuring RF drivers 121 and 131 to generate multi-level outputs as described in T. Sakamoto, et. al., "50-Gb/s 16 QAM by a Quad-Parallel Mach-Zehnder Modulator," Optical Communication—Post Deadline Papers, 33rd European Conference, 2007, pp. 1-2, which is incorporated by reference. Modulator 100 may also be employed to generate 16QAM and higher order modulation signals by cascading modulator 100 and an optical phase modulator (PM) as described in M. Serbay, et. al., "Implementation of Differential Precoder for High-Speed Optical DQPSK Transmission," Electronics Letters, volume 40, issue 20, 30 Sep. 2004, pp. 1288-1289 (Serbay), which is incorporated by reference.

SUMMARY

One embodiment is a method for using a phase modulator (PM) to generate a phase-shift keying (PSK) data signal, the method comprising receiving an optical input signal; coupling with a direct current (DC) bias signal from a controlling circuit; adjusting the modulation efficiency of the PM by controlling the DC bias signal; coupling with a digital data signal from a precoder; and modulating the input signal according to the digital data signal to produce the PSK data signal.

A variation on this embodiment is wherein the PM comprises a first PM segment coupled with a second PM segment, and wherein adjusting the modulation efficiency of the PM comprises adjusting a DC bias of the first PM segment separately from a DC bias of the second PM segment. Another variation on this embodiment is wherein the input signal is a continuous wave signal. Another variation on this embodiment is wherein the modulated data signal is a second modulated signal, and wherein the input signal is a first modulated signal which may be generated by a Mach-Zehnder modulator or by another PM.

Another embodiment is an apparatus for generating an optical phase-shift keying (PSK) data signal from an optical input signal, the apparatus comprising a multi-segment doped waveguide configured to receive the optical input signal and to output the PSK data signal; a controlling circuit coupled with the multi-segment waveguide, wherein the controlling circuit is configured to adjust the modulation efficiency of the PM by controlling the direct current (DC) bias signal of each segment of the waveguide; a plurality of inverter drivers coupled with the waveguide; and a precoder coupled with the plurality of inverter drivers, wherein the precoder is configured to provide a plurality of digital data signals to the plurality of inverter drivers.

A variation on this embodiment is to add a laser diode coupled with the waveguide, wherein the laser diode provides the input optical signal. Another variation on this embodiment is where a phase modulator (PM) coupled with the waveguide provides the input optical signal. Another variation on this embodiment is where a Mach-Zehnder modulator (MZM) coupled with the waveguide provides the input optical signal.

Another embodiment is an apparatus for generating a modulated data signal, the apparatus comprising a precoder configured to code data for modulation and outputting a plurality of high-speed data signals; a Mach-Zehnder modulator (MZM) coupled to the precoder, wherein the MZM is configured to receive a first data signal of the plurality of data signals and to modulate an input signal to produce a first modulated signal according to the first data signal; a phase modulator (PM) coupled to the precoder and to the MZM, wherein the PM is configured to receive a second data signal of the plurality of data signals, and wherein the PM is configured to receive the first modulated signal from the MZM to produce a second modulated signal according to the second data signal; and a controlling circuit coupled to the PM, wherein the controlling circuit is configured to adjust a direct current (DC) bias of the PM.

One variation on this embodiment is to add a laser diode configured to transmit the input signal, wherein the laser diode is coupled with the MZM. Another variation on this embodiment is the MZM generating 0 and π phase changes and with the PM generating 0 and +π/2 phase changes, wherein the second modulated signal is a 4-level quadrature amplitude modulation (QAM) signal. Another variation on this embodiment is wherein the MZM and PM comprise silicon photonics (SiP) materials. Another variation on this embodiment is wherein the PM further comprises a first PM segment coupled with a second PM segment, and wherein the controlling circuit adjusts a DC bias of the first PM segment separately from a DC bias of the second PM segment. Another variation on this embodiment is wherein the MZM further comprises n MZM modulator segments, wherein the second output signal is an n-level quadrature amplitude modulation (QAM) (nQAM) signal, and wherein n is a number greater than one. Another variation on this embodiment is wherein the PM further comprises a first PM segment coupled with a second PM segment, wherein the controlling circuit adjusts a DC bias of the first PM segment separately from a DC bias of the second PM segment, wherein the MZM comprises two MZM modulator segments, and wherein the second output signal is a 16QAM signal.

Another embodiment is an apparatus for generating a dual polarization modulated data signal, the apparatus comprising an optical splitter configured to split a continuous wave input signal into an X-polarization path and a Y-polarization path; a first Mach-Zehnder modulator-phase modulator (MZM-PM) modulator and a second MZM-PM modulator, the first and second MZM-PM modulators each comprising a Mach-Zehnder modulator (MZM) configured to modulate an input signal to produce a first modulated signal; a phase modulator (PM) configured to modulate the first modulated signal to produce a second modulated signal; a precoder configured to code data for modulation by the MZM and PM; and a controlling circuit configured to adjust a direct current (DC) bias of the PM; a polarization rotator coupled with the second MZM-PM modulator; and a polarization beam combiner coupled with first MZM-PM and the polarization rotator, wherein the X-polarization path is the input signal for the first MZM-PM and wherein the Y-polarization path is the input signal for the second MZM-PM.

One variation on this embodiment is to add a laser diode to transmit the continuous wave input signal. Another variation on this embodiment is wherein the MZM of the first MZM-PM is configured to generate 0 and π phase changes, wherein the PM of the first MZM-PM is configured to generate 0 and +π/2 phase changes, and wherein the second modulated signal of the first MZM-PM is a 4-level quadrature amplitude modulation (QAM) signal. Another variation on this embodiment is wherein the first MZM-PM comprises silicon photonics (SiP) materials. Another variation on this embodiment is wherein the PM of the first MZM-PM comprises a first PM segment coupled with a second PM segment, and wherein the controlling circuit of the first MZM-PM adjusts a DC bias of the first PM segment separately from a DC bias of the second PM segment. Another variation on this embodiment is wherein the MZM of the first MZM-PM further comprises n MZM modulator segments, wherein the second output signal of the first MZM-PM is an n-level quadrature amplitude modulation (QAM) (nQAM) signal, and wherein n is a number greater than 1. Another variation on this embodiment is wherein the PM of the first MZM-PM comprises a first PM segment coupled with a second PM segment, wherein the controlling circuit of the first MZM-PM adjusts a DC bias of the first PM segment separately from a DC bias of the second PM segment, wherein the MZM of the first MZM-PM comprises 2 segments of modulators, and wherein the second output signal of the first MZM-PM is a 16QAM signal.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 1 is a schematic diagram of a conventional IQ QPSK modulator.

FIGS. 2A-2C illustrate constellations generated by the conventional IQ QPSK modulator of FIG. 1.

DETAILED DESCRIPTION

Figure 3:
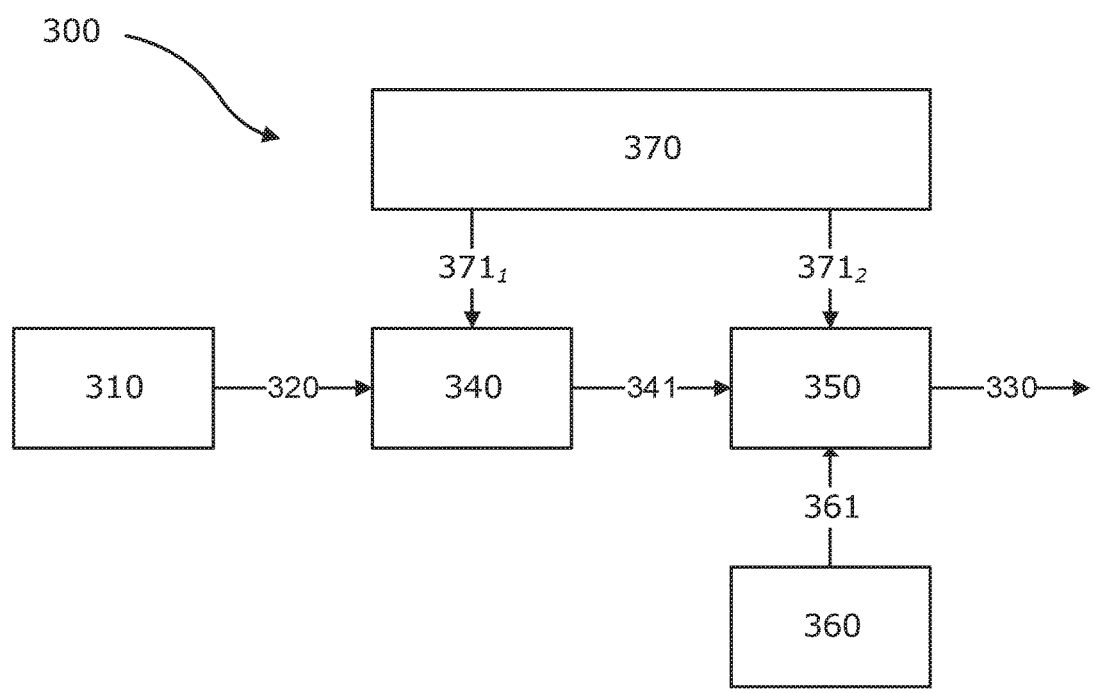
FIG. 3 is a schematic diagram of a Mach-Zehnder modulator phase modulator (MZM-PM) configuration that implements modulation efficiency control according to an embodiment of the disclosure.

It should be understood at the outset that, although illustrative implementations of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are various embodiments for generating nQAM and nPSK signals with tunable modulation efficiency. The disclosed embodiments provide a method and apparatus to reduce coherent transceiver power consumption and cost. The disclosed embodiments also improve flexibility in generation of different modulation formats. The disclosed embodiments employ silicon photonics (SiP)-based optical modulators to generate nQAM and nPSK signals.

Prior art QPSK modulators and QAM modulators produce a signal having an intrinsic 3 dB optical loss because MZM 110 needs to operate at a quadrature point. In addition, prior art MZMs need to be locked to the quadrature point, which adds complexity to the control of the prior art modulator and increases power-on time. Further, while it is known to drive a prior art PM as a function of RF signal amplitudes to produce phase modulation, the performance of the PM may be degraded by RF signal variations at the beginning of life and after aging.

To resolve these and other problems, and as will be more fully explained below, embodiments of the apparatuses and methods disclosed herein generate n-level quadrature amplitude modulation (nQAM) and n-level phase-shift keying (nPSK) signals with tunable modulation efficiency that does not incur the intrinsic 3 dB optical loss. The embodiments discussed herein employ a simpler lock algorithm. The embodiments discussed herein are stable over temperature and aging. The embodiments discussed herein operate as a function of DC biases instead of RF signal amplitudes.

In an embodiment, an optical modulator comprises an MZM coupled to an optical PM, where the modulation efficiency or modulation depth of the PM is adjusted by controlling the DC bias of the PM. To generate nQAM signals, the optical modulator may employ a segmented MZM with n plurality of sections of modulators. In another embodiment, an optical modulator comprises n plurality of cascading segments of PMs configured to produce an nPSK signal, where the modulation efficiency of the PMs is tuned by controlling the DC biases of the PMs. The disclosed embodiments do not experience a 3 dB modulation loss. The disclosed embodiments employ a significantly simpler lock algorithm. The disclosed SiP-based optical modulators are stable over temperature and aging. The disclosed PM operates as a function of DC biases instead of RF signal amplitudes. The disclosed modulation efficiency control mechanisms can applied to any type of optical modulators, such as DP-16QAM modulators, DP-8QAM modulators, DP-12QAM modulators, and nPSK modulators.

FIG. 3 discloses a schematic diagram of MZM-PM modulator 300 which modulates input signal 320 from light source 310 to produce nQAM output signal 330 using tunable modulation efficiency. Modulator 300 may be employed by an optical transmitter to modulate data signals for transmission. Modulator 300 may be constructed from SiP-based materials in some embodiments. Modulator 300 comprises MZM 340, PM 350, and controlling circuit 360. MZM 340 is coupled to light source 310 and configured to generate 0 and $\pi$ phase changes (as a result of modulation) when MZM 340 operates at a null point. PM 350 is coupled to MZM 340 and receives the modulated light signal that is modulated by MZM 340, wherein PM 350 is configured to generate 0 and $+\pi/2$ phases in addition to the phase changes generated by MZM 340. High-speed electrical data signals $371_1$ and $371_2$ from precoder 370 control the modulations performed by MZM 340 and PM 350 respectively. Thus, modulator 300 produces a 4-level QPSK signal 330 in the example shown. The controlling circuit 360 is configured to control the DC bias 361 of the PM 350. By tapping PM 350's output optical power to controlling circuit 360, controlling circuit 360 may process data according to the output optical power and adjust the DC bias voltage 361 of PM 350 such that DC bias voltage 361 is locked to an optimum point. Controlling circuit 360 and precoder 370 may be implemented using discrete circuitry, combined on an application-specific integrated circuit, or using any other configuration known to one of ordinary skill.

Figure 4A:
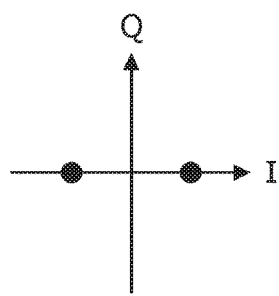
FIGS. 4A and 4B illustrate constellations generated by employing the MZM-PM configuration of FIG. 3.
Figure 4B:
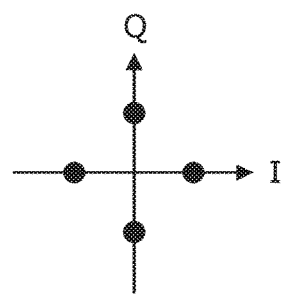

FIGS. 4A and 4B disclose the output signals generated by employing modulator 300. FIG. 4A is a constellation diagram of output signal 341 of MZM 340 showing 0 and $\pi$ phase changes produced by MZM 340. FIG. 4B is a constellation diagram of output signal 330 at the output of PM 350 showing the 0 and +π/2 phases produced by PM 350 (in addition to the 0 and π phase changes produced by MZM 340).

Figure 5:
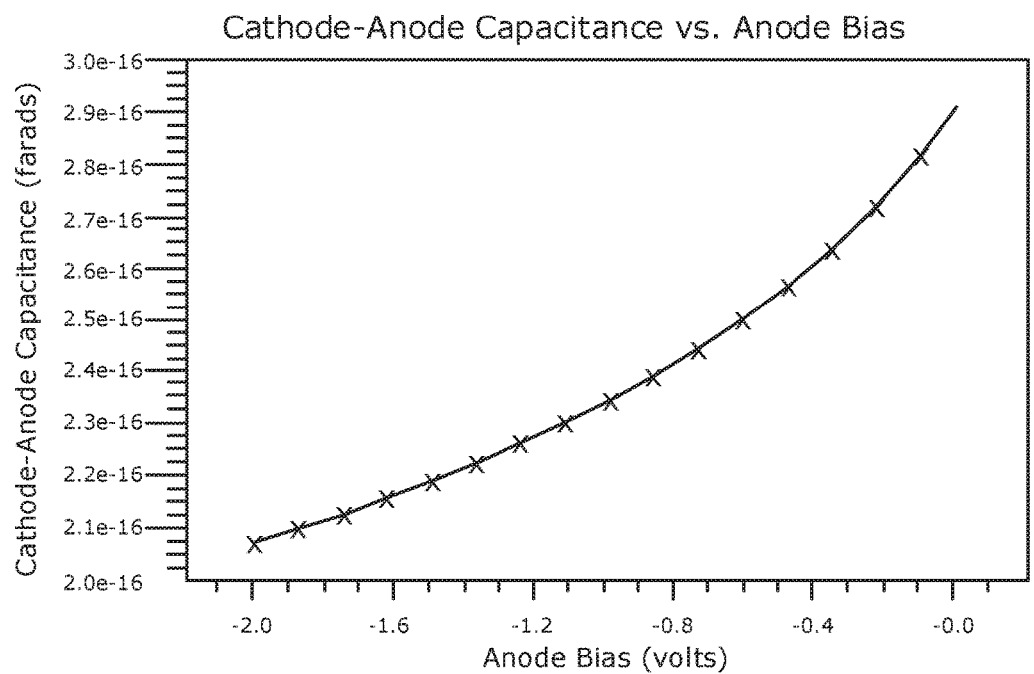
FIG. 5 is a graph illustrating positive-negative (PN) junction capacitance of a Si-based phase modulator as a function of DC bias voltages.

FIG. 5 discloses a graph illustrating the PN junction capacitance of SiP-based PM 350 as a function of DC bias voltages 361. The x-axis represents DC bias voltage 361, shown as anode bias, in units of Volts. The y-axis represents PN junction capacitance, shown as cathode-anode capacitance, in units of Farads. As shown, the PN junction capacitance is high at low bias and is much higher at a slightly forward bias condition. The PN junction capacitance corresponds to modulation efficiency. The capacitance of the PN junction can be increased greatly when it is biased at a slight forward voltage. Thus, the phase modulation depth of PM 350 may be adjusted by controlling DC bias voltage 361 of PM 350. The phase modulation depth (sometimes referred to as phase modulation index) refers to how much the phase modulated variable of the carrier signal varies around its unmodulated level. Therefore, the phase modulation depth relates to the variation in the phase of the carrier signal.

Figures 6, 7:
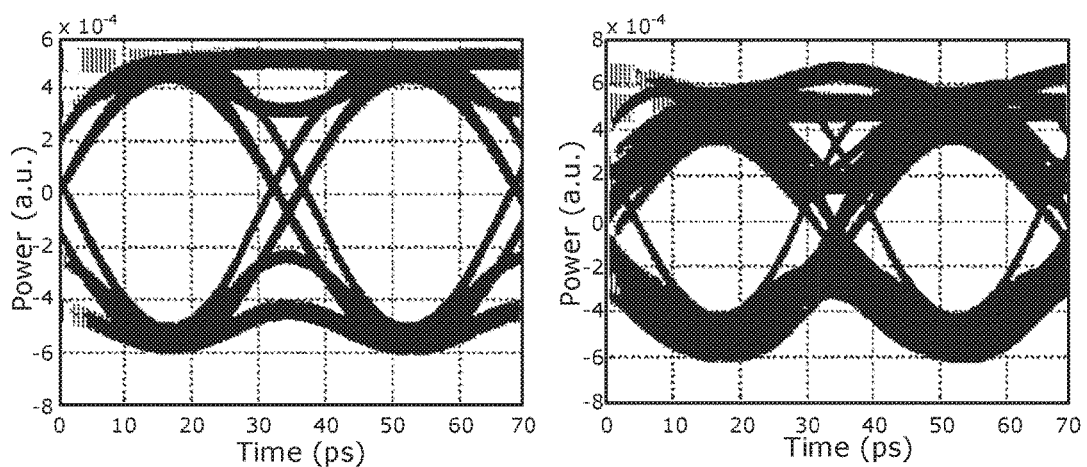
FIG. 6 is a demodulated eye diagram of a 28 gigabaud (Gbaud) differential quadrature phase-shift keying (DQPSK) signal generated by a prior art IQ DQPSK modulator.
FIG. 7 is a demodulated eye diagram of a 28 Gbaud DQPSK signal generated by employing the MZM-PM configuration of FIG. 3.
Figure 8:
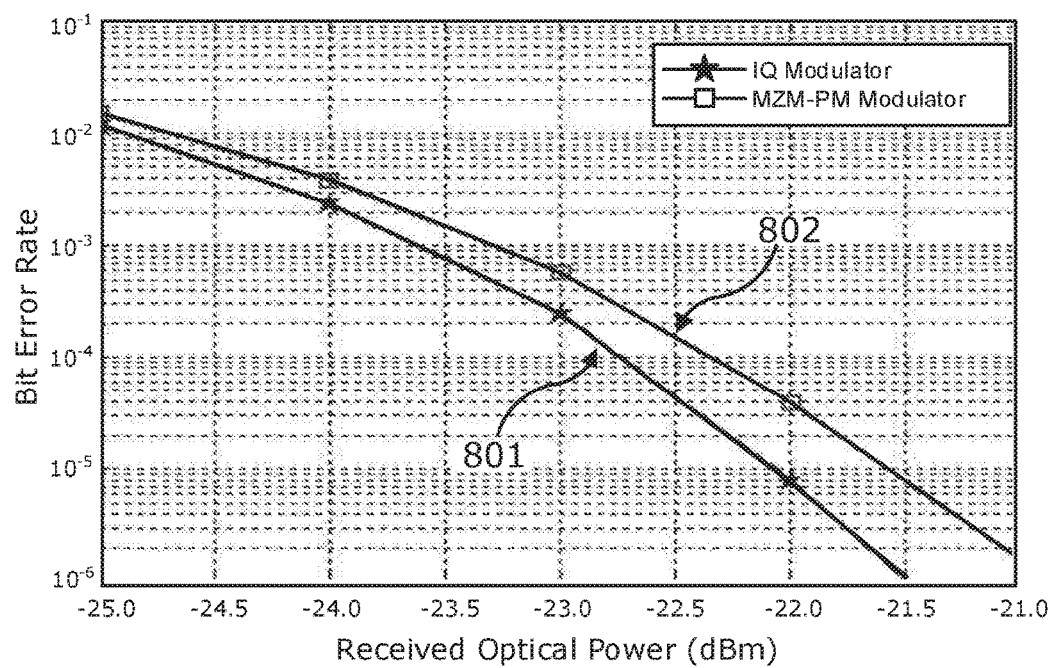
FIG. 8 is a graph comparing bit-error-rate (BER) performances of a 28 Gbaud DQPSK signal generated by employing the MZM-PM configuration of FIG. 3 with that of a prior art IQ modulator.

FIG. 6 discloses a demodulated eye diagram of a 28 Gbaud DQPSK signal generated by a prior art IQ modulator, and FIG. 7 is a demodulated eye diagram of a 28 Gbaud DQPSK signal generated by employing modulator 300. As can be seen by comparing FIGS. 6 and 7, MZM-PM modulator 300 produces similar results as the prior art DQPSK modulator. FIG. 8 discloses a graph comparing bit error rate (BER) as a function of received optical power (ROP) of a 28 Gbaud DQPSK signal 801 generated by a prior art IQ modulator with that of a 28 Gbaud DQPSK signal 802 generated by employing modulator 300. As can be seen by comparing signals 801 and 802, MZM-PM modulator 300 produces similar results as the prior art DQPSK modulator.

Figure 9:
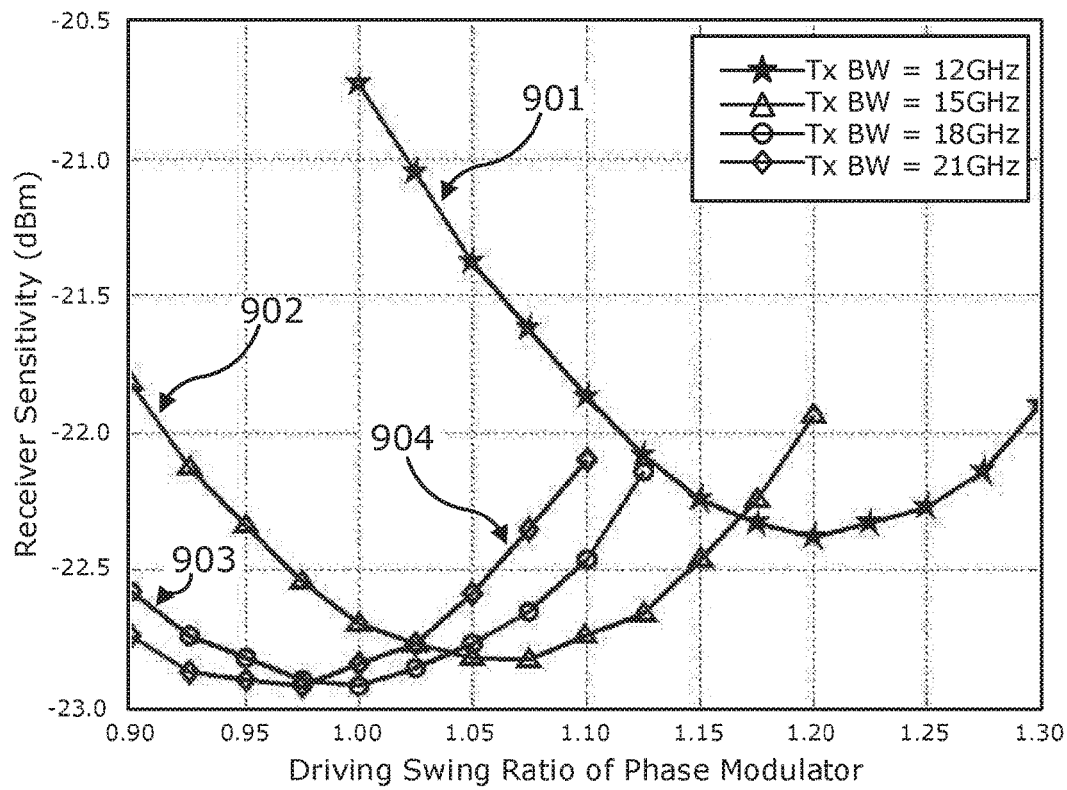
FIG. 9 is a graph illustrating receiver sensitivity as a function of PM driving swing ratios at various transmitter (Tx) bandwidths.

FIG. 9 discloses a graph illustrating receiver sensitivity as a function of driving swing ratios of PM 360 to pull-in voltage (Vpi) at various transmitter bandwidths 901 (12 gigahertz (GHz)), 902 (15 GHz), 903 (18 GHz), and 904 (21 GHz). For example, a transmitter employing MZM-PM modulator 300 is configured to transmit a signal and the receiver sensitivity is measured at a receiver, wherein the receiver is configured to receive the signal from the transmitter.

For a given transmitter bandwidth, there is an optimum driving ratio. The performance of a bandwidth limited transmitter may be improved by over-driving PM 350. The driving swing ratio of PM 350 may be varied by adjusting DC bias 361 of PM 350. Thus, the performance may be tuned by adjusting the DC bias 361 of PM 350 such that the receiver sensitivity is optimized for a given transmitter bandwidth.

Alternatively, the required phase modulation depth may be adjusted to a desired point by controlling the DC bias 361 of PM 350. The tunable phase efficiency mechanisms may also be applied to compensate Vpi variations due to the SiP MZM fabrication process, and thus may improve yields of SiP-based optical transmitters.

Figure 10:
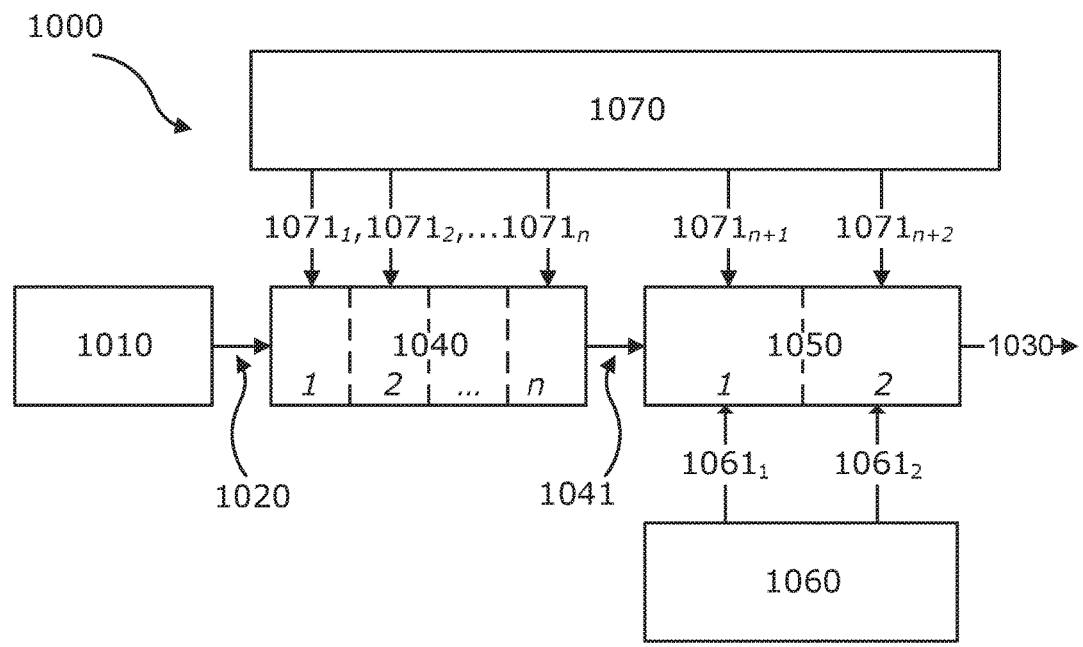
FIG. 10 is a schematic diagram of an nQAM modulator that implements modulation efficiency control according to an embodiment of the disclosure.

FIG. 10 discloses a schematic diagram of MZM-PM modulator 1000 which modulates input signal 1020 from light source 1010 to produce QAM output signal 1030 using tunable modulation efficiency. Modulator 1000 may be employed by an optical transmitter to modulate data signals for transmission and may be constructed from SiP-based materials. Modulator 1000 comprises segmented MZM 1040 and segmented PM 1050. Segmented MZM 1040 comprises a similar configuration as described in Y. Ehrlichman, et. al, "Improved Digital-to-Analog Conversion Using Multi-Electrode Mach-Zehnder Interferometer," Journal of Lightwave Technology, vol. 26, no. 21, Nov. 1, 2008 and Zheng, et. al, "Digital Optical Modulator for Programmable nQAM Generation," and in United States Patent Publication US2015/0132007A1, both of which are incorporated by reference. Segmented MZM 1040 comprises n segments of modulators, driven by electrical high-speed data signals $1071_1$ through $1071_n$ from precoder 1070. The two segments of segmented PM 1050 are driven by electrical high-speed data signals $1071_{n+1}$ and $1071_{n+2}$. Segmented PM 1050 is thus configured to generate additional phases such as 0, π/4, π/2, or 3π/4, which are added to the signal generated by the segmented MZM 1040. In other embodiments, segmented PM 1050 may have additional segments to produce additional phases. Controlling circuit 1060 controls DC biases $1061_1$ and $1061_2$ of segmented PM 1050 to optimize the modulation efficiency of segmented PM 1050. Like modulator 300, controlling circuit 1060 and precoder 1070 may be implemented using discrete circuitry, combined on an application-specific integrated circuit, or using any other configuration known to one of ordinary skill.

Using the configuration shown in FIG. 10, modulator 1000 avoids the intrinsic 3 dB modulation loss that is found in conventional 16QAM modulators. In addition, modulator 1000 eliminates one pair of MZMs and the corresponding RF drivers when compared to the configuration of conventional 16QAM modulators.

Figure 11A:
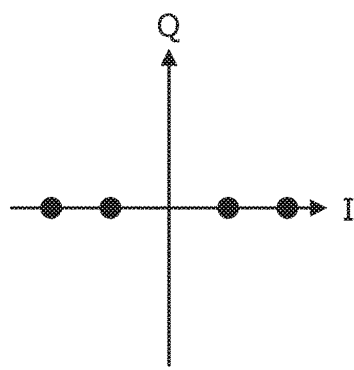
FIGS. 11A and 11B illustrate constellations generated by the nQAM modulator of FIG. 10.
Figure 11B:
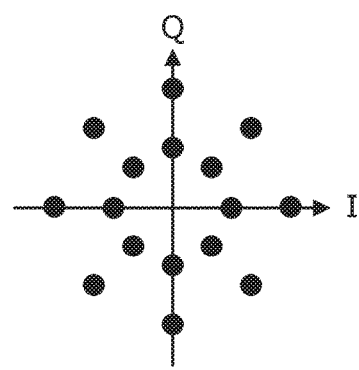

FIGS. 11A and 11B disclose the output signals generated by employing modulator 1000. FIG. 11A is a constellation diagram of output signal 1041 of segmented MZM 1040 when there are two segments (i.e., when n=2). FIG. 11B is a constellation diagram of the 16QAM output signal 1030 when there are two segments in segmented MZM 1040 (i.e., when n=2).

Figure 12:
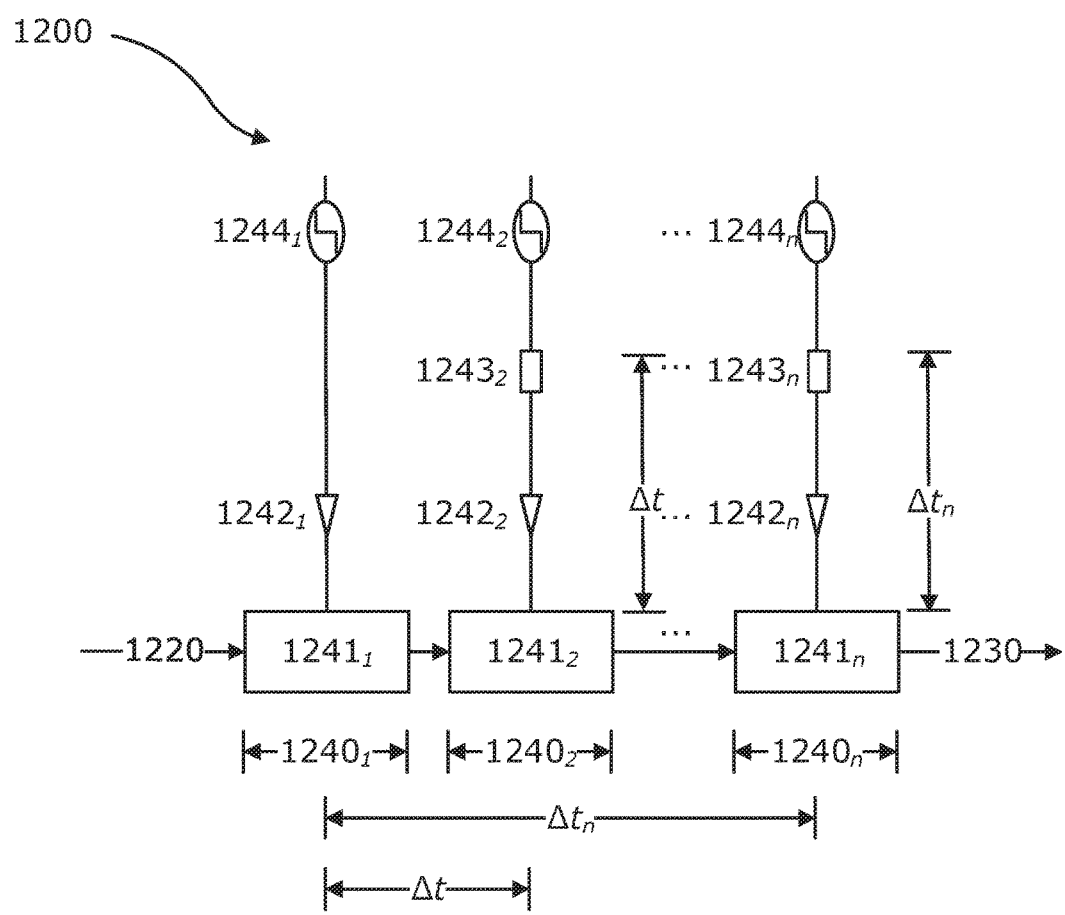
FIG. 12 is a schematic diagram illustrating a scheme for controlling time delay between optical and electrical signals according to an embodiment of the disclosure.

FIG. 12 discloses a schematic diagram illustrating an embodiment of a portion of a segmented MZM 1200 with improvements for controlling time delay between optical and electrical signals. MZM 1200 receives an optical input signal 1220 and produces a modulated optical output signal 1230. Segmented MZM 1200 comprises n segments $1240_n$, each receiving an electrical high-speed data signal $1244_n$, logical inverter driver $1242_n$, and a doped waveguide portion $1241_n$. MZM segments $1240_2$ through $1240_n$ also include delays $1243_2$ through $1243_n$. The delay of the optical signal between waveguide portions $1241_1$ and $1241_2$ is Δt, and the delay of the electrical signal created by delay $1243_2$ is also Δt. Similarly delays $1243_3$ through $1243_n$ create electrical delays equal to the cumulative optical delays in the chain of waveguide portions $1241_3$-$1241_n$ so that the input data signals are similarly delayed and are therefore in-phase with the optical signal in each waveguide portion. Thus the optical delay between $1241_1$ and $1241_n$ and the delay created by delay $1243_n$ are both $Δt_n$. The configuration shown in FIG. 12 can be applied to the MZMs any of the embodiments of the present disclosure.

Figure 13:
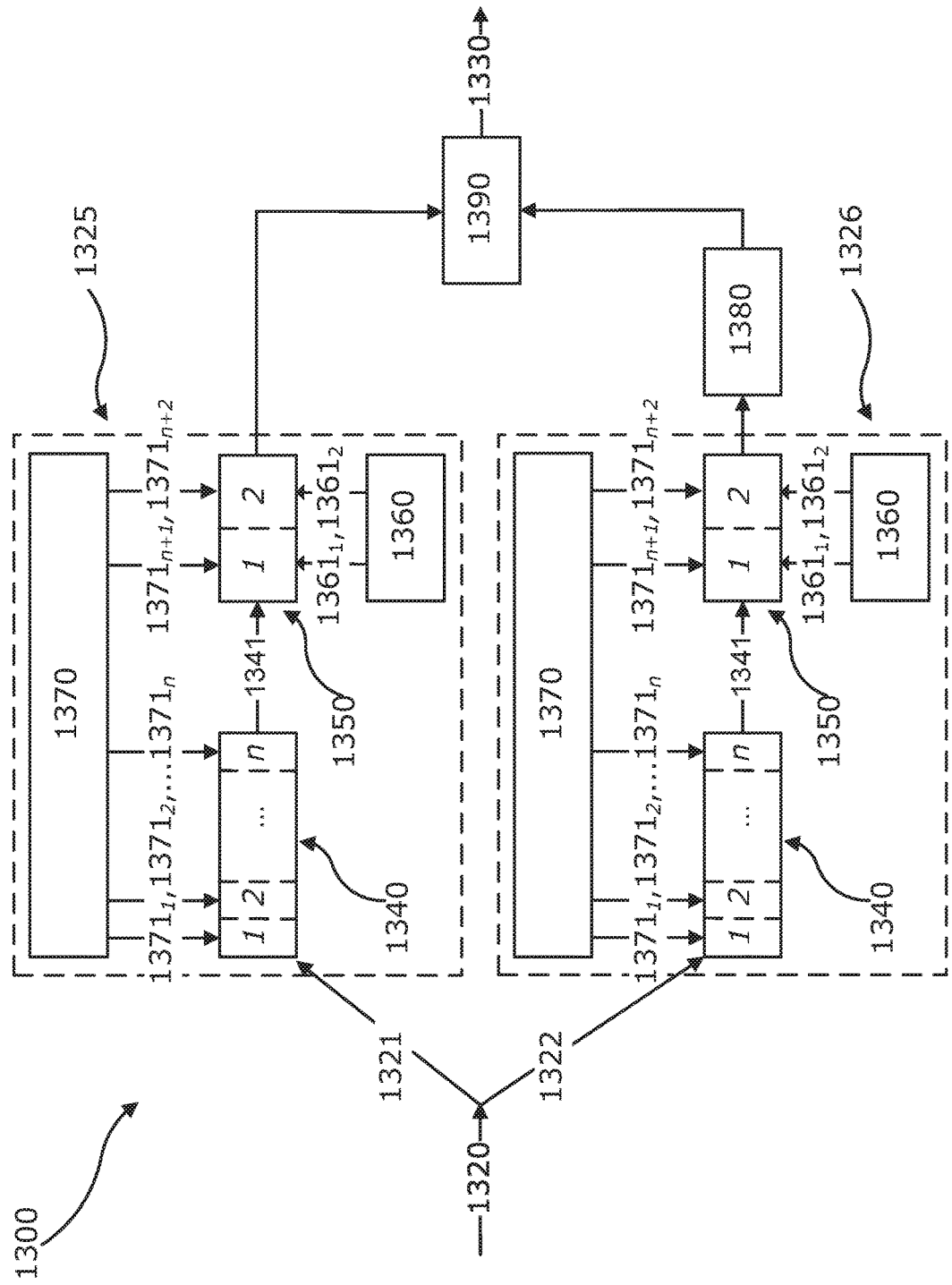
FIG. 13 is a schematic diagram of a dual-polarization 16 quadrature amplitude modulation (DP-16QAM) modulator that implements modulation efficiency control according to an embodiment of the disclosure.

FIG. 13 discloses a schematic diagram of a DP-16QAM modulator 1300 that uses tunable modulation efficiency according to an embodiment of the disclosure. The modulator 1300 is constructed by duplicating the structure of MZM-PM modulator 1000 as parallel MZM-PM 1325 and MZM-PM 1326. The modulator 1300 splits a continuous optical wave input signal 1320 into two signals 1321 and 1322, referred to as an X-polarization path and a Y-polarization path, respectively. Input signals 1321 and 1322 pass through MZM-PM 1325 and MZM-PM 1326, respectively. Like segmented MZM 1040 in FIG. 10, each segmented MZM 1340 comprises n segments of modulators driven by electrical high-speed data signals $1371_1$ through $1371_n$ from precoder 1370, and produces output signals 1341. Like segmented PM 1050 in FIG. 10, each segmented PM 1350 comprises two segments driven by electrical high-speed data signals $1371_{n+1}$ and $1371_{n+2}$. Controlling circuits 1360 adjust the DC biases $1361_1$ and $1361_2$. The output signal of MZM-PM 1326 passes through polarization rotator 1380, which rotates the signal 90°, and modulated signals from MZM-PM 1325 and polarization rotator 1380 path are rejoined by polarization beam combiner 1390 to produce output signal 1330. Each segmented MZM 1340 produces one-dimensional amplitude and phase modulated signals. For example, when each segmented MZM 1340 comprises two segments (i.e., n=2), each segmented MZM 1340 produces an output signal similar to the constellation diagram shown in FIG. 11A. Each segmented PM 1350 produces an output signal similar to the constellation diagram shown in FIG. 11B.

Figure 14:
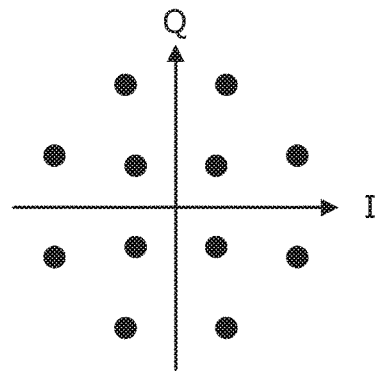
FIG. 14 is a constellation diagram of a 12QAM signal generated by configuring the nQAM modulator of FIG. 10 as a 16QAM modulator.

In an embodiment, the modulator 1300 with a two-segment MZM may be extended to generate 12QAM and star 8QAM by manipulating the electrical high-speed data signals $1371_n$ in the logic functions of precoders 1370. FIG. 14 is a constellation diagram of a 12QAM signal generated by configuring modulator 1300 as a 16QAM modulator with a two-segment MZM. The 12QAM modulated signal is generated by removing four points from the inner ring of the 16QAM constellation shown in the constellation diagram of FIG. 11B and rotating the eight points in the outer ring by π/8. A 12QAM modulated signal carries 7 bits for every 2 symbols, where the mapping may be realized in the precoder 1370 via logic operation. As shown, the 12QAM constellation has equal spacing at the outer ring which is expected to provide better performance than conventional 12QAM.

Figure 15:
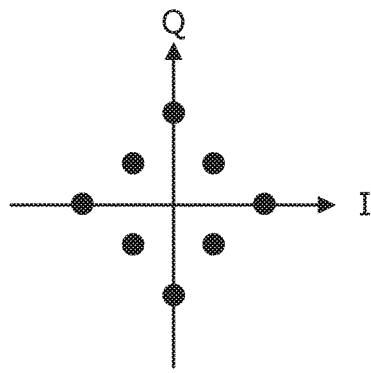
FIG. 15 is a constellation diagram of a star 8QAM signal generated by configuring the nQAM modulator of FIG. 10 as a 16QAM modulator.

FIG. 15 discloses a constellation diagram of a star 8QAM signal generated by configuring nQAM modulator 1000 as a 16QAM modulator with two MZM segments by manipulating electrical high-speed data signals $1371_n$ in the logic functions of precoders 1370, and using two MZM segments. The star 8QAM modulated signal is generated by removing four points from the outer ring and four points from the inner ring of the 16QAM constellation shown in the constellation diagram in FIG. 11B and rotating the remaining four points in the inner ring by π/4. The mapping of the star 8QAM may be realized in the precoder 1370 via a logic operation.

Further, by manipulating electrical high-speed data signals $1371_n$ in the logic functions of precoders 1370 in a configuration with two MZM segments, modulator 1300 can be modified to generate DP-12QAM and star DP-8QAM with similar process to those of single polarization.

Figure 16:
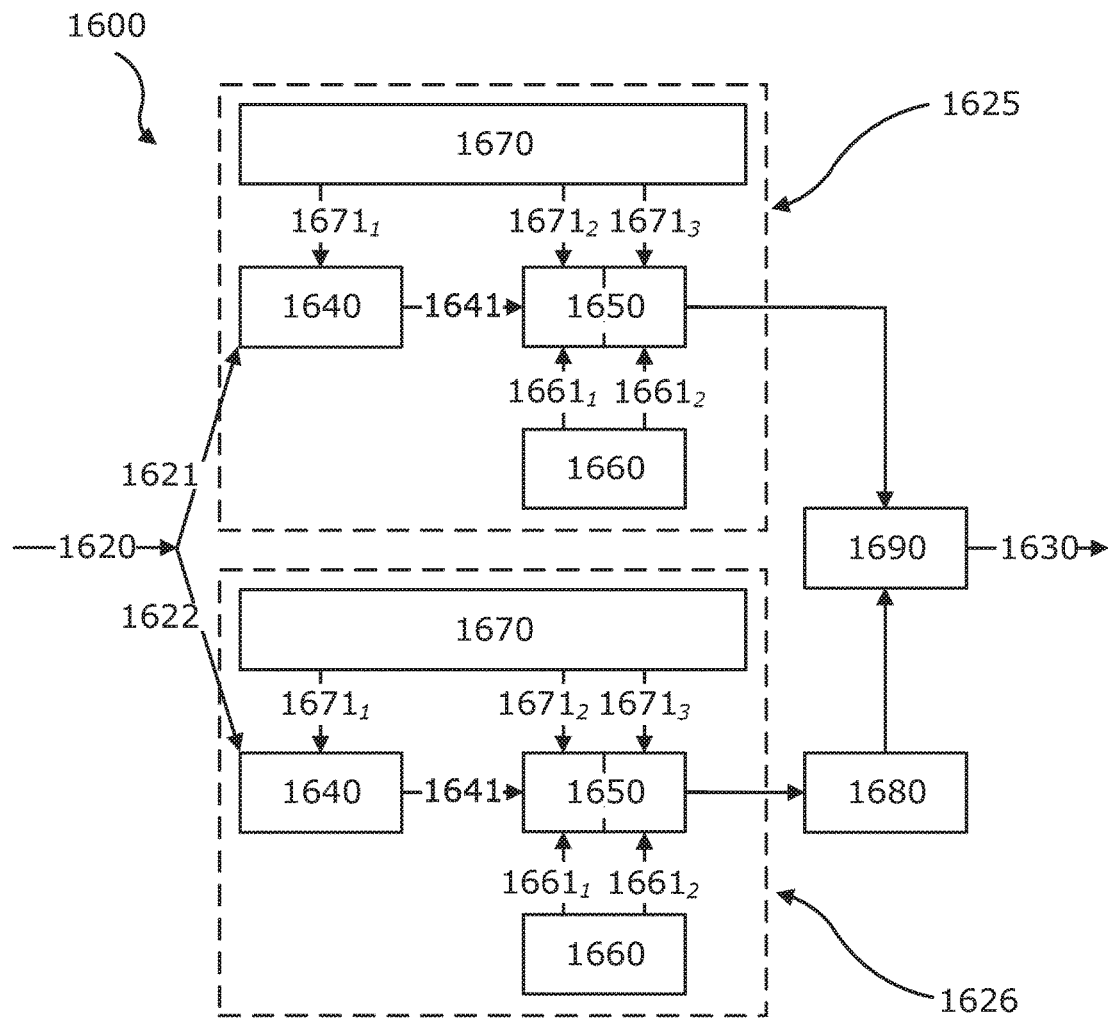
FIG. 16 is a schematic diagram of a DP-16QAM modulator that implements modulation efficiency control according to another embodiment of the disclosure.

FIG. 16 discloses a schematic diagram of DP-16QAM modulator 1600 which uses tunable modulation efficiency. Modulator 1600 splits optical input signal 1620 into input signal 1621 on the X-polarization path and input signal 1622 on the Y-polarization path. MZMs 1640 are driven by 4-level electrical high-speed data signals $1671_1$ and segmented PMs 1650 are driven by 2-level electrical high-speed data signals $1671_2$ and $1671_3$. The modulation efficiency of modulator 1600 is adjusted by controlling circuits 1660 by adjusting DC biases 1661 of PMs 1650. Modulator 1600 further employs precoders 1670 to code and synchronize the electrical signals and the optical signals. The output signal of MZM-PM 1626 passes through polarization rotator 1680, which rotates the signal 90°, and modulated signals from MZM-PM 1625 and polarization rotator 1680 path are rejoined by polarization beam combiner 1690 to produce output signal 1630. Each MZM 1640 produces one-dimensional amplitude and phase modulated signals 1641 comprising constellations similar to the constellation diagram shown in FIG. 11A. Output 1630 produces multi-levels constellation similar to constellation diagram FIG. 11B.

Figure 17:
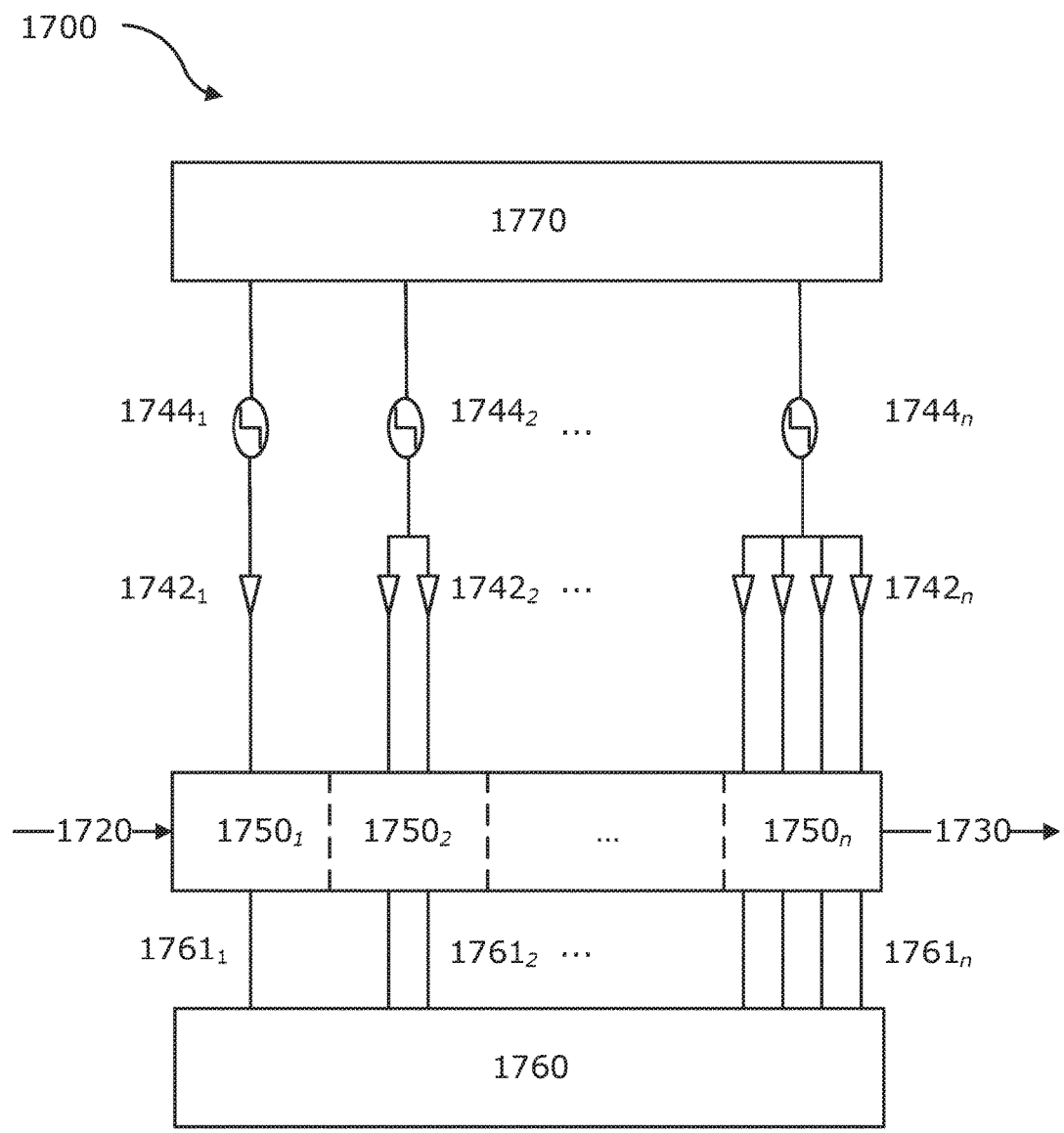
FIG. 17 is a schematic diagram of an nPSK modulator according to an embodiment of the disclosure.

FIG. 17 discloses a schematic diagram of an nPSK modulator 1700 according to an embodiment of the disclosure. The modulator 1700 comprises multi-segment PM 1750 controlled by precoder 1770 to produce modulated output signal 1730. Precoder 1770 produces electrical high-speed data signals $1744_n$ which are inverted by inverter drivers $1742_n$ and coupled with PM segments $1750_n$. The modulation efficiency of the segments of PM 1750 is tuned using controlling circuit 1760 by adding DC biases $1761_n$ to corresponding segments of PM 1750. Input signal 1720 may be a continuous wave signal or it may be the modulated output signal of an MZM; for the latter, nPSK modulator 1700 can be used for PM 350, PM 1050, PM 1350, or PM 1650. The advantages of the disclosed nPSK modulator 1700 compared to the prior art modulators may include tunable modulation efficiency, simplified PM bias control, significant RF power consumption saving, significant optical loss saving, for example, about 3 dB, and significant size reduction due to the employment of fewer Mach-Zehnder interferometers (MMIs) and MZMs.

Disclosed herein in is a method for using a phase modulator (PM) to generate a phase-shift keying (PSK) data signal. The method includes means for receiving an optical input signal, means for coupling with a direct current (DC) bias signal from a controlling circuit, means for adjusting the modulation efficiency of the PM by controlling the DC bias signal, means for coupling with a digital data signal from a precoder, and means for modulating the input signal according to the digital data signal to produce the PSK data signal.

Further disclosed herein is an apparatus for generating an optical phase-shift keying (PSK) data signal from an optical input signal. The apparatus includes a means for receiving the optical input signal and to output the PSK data signal; a means for adjusting the modulation efficiency of the PM by controlling the direct current (DC) bias signal of each segment of the waveguide, and a means for providing a plurality of digital data signals to the plurality of inverter drivers.

Further disclosed herein is an apparatus for generating a modulated data signal. The apparatus includes a means for coding data for modulation and outputting a plurality of high-speed data signals, and means for receiving a first data signal of the plurality of data signals and modulating an input signal to produce a first modulated signal according to the first data signal, a means for receiving a second data signal of the plurality of data signals, a means for receiving the first modulated signal from the MZM to produce a second modulated signal according to the second data signal, and a means for adjusting a direct current (DC) bias of the PM.

Further disclosed herein is an apparatus for generating a dual polarization modulated data signal. The apparatus includes a means for splitting a continuous wave input signal into an X-polarization path and a Y-polarization path, a means for modulating an input signal to produce a first modulated signal, a means for modulating the first modulated signal to produce a second modulated signal, a means for coding data for modulation by the MZM and PM, a means for adjusting a direct current (DC) bias of the PM, a means for rotating the signal from the second MZM-PM modulator, and a means for combining the signals from the first and second MZM-PMs.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. An apparatus for generating a modulated data signal, the apparatus comprising:
   a precoder configured to code data for modulation and to output a plurality of electrical data signals;
   a Mach-Zehnder modulator (MZM) coupled to the precoder, the MZM configured to receive a first electrical data signal of the plurality of electrical data signals and to modulate an optical input signal to produce a first modulated signal according to the first electrical data signal;
   a phase modulator (PM) coupled to the precoder and to the MZM, the PM configured to:
      receive a second electrical data signal of the plurality of electrical data signals,
      receive the first modulated signal from the MZM, and
      modulate the first modulated signal to produce a second modulated signal according to the second electrical data signal; and
   a controlling circuit coupled to the PM, the controlling circuit configured to adjust a direct current (DC) bias of the PM,
   wherein the MZM is configured to generate 0 and $\pi$ phase changes, the PM is configured to generate 0 and $+\pi/2$ phase changes, and the second modulated signal is a 4-level quadrature amplitude modulation (4QAM) signal.

2. The apparatus of claim 1, further comprising a laser diode configured to transmit the optical input signal, and wherein the laser diode is coupled with the MZM.

3. The apparatus of claim 1, wherein the MZM and PM comprise silicon photonics (SiP) materials.

4. An apparatus for generating a modulated data signal, the apparatus comprising:
   a precoder configured to code data for modulation and to output a plurality of electrical data signals;
   a Mach-Zehnder modulator (MZM) coupled to the precoder, the MZM configured to receive a first electrical data signal of the plurality of electrical data signals and to modulate an optical input signal to produce a first modulated signal according to the first electrical data signal;
   a phase modulator (PM) coupled to the precoder and to the MZM, the PM comprising a first PM segment coupled with a second PM segment, the PM configured to:
      receive a second electrical data signal of the plurality of electrical data signals,
      receive the first modulated signal from the MZM, and
      modulate the first modulated signal to produce a second modulated signal according to the second electrical data signal; and
   a controlling circuit coupled to the PM, the controlling circuit configured to adjust a direct current (DC) bias of the PM, the controlling circuit configured to adjust a first DC bias of the first PM segment separately from a second DC bias of the second PM segment.

5. The apparatus of claim 1, wherein the MZM further comprises n number of MZM modulator segments, wherein the second modulated signal is an n-level quadrature amplitude modulation (nQAM) signal, and wherein n is a number greater than one.

6. The apparatus of claim 4, wherein the MZM comprises two MZM modulator segments, and wherein the second modulated signal is a 16-level quadrature amplitude modulation (16QAM) signal.

* * * * *